US008838444B2

(12) United States Patent
Vos et al.

(10) Patent No.: US 8,838,444 B2
(45) Date of Patent: Sep. 16, 2014

(54) METHOD OF ESTIMATING NOISE LEVELS IN A COMMUNICATION SYSTEM

(75) Inventors: Koen Vos, San Francisco, CA (US); Karsten Vandborg Sorensen, Stockholm (SE); Jon Bergenheim, Uppsala (SE)

(73) Assignee: Skype, Dublin (IE)

( * ) Notice: Subject to any disclaimer, the term of this patent is extended or adjusted under 35 U.S.C. 154(b) by 1149 days.

(21) Appl. No.: 12/006,057

(22) Filed: Dec. 28, 2007

(65) Prior Publication Data

US 2008/0201137 A1 Aug. 21, 2008

(30) Foreign Application Priority Data

Feb. 20, 2007 (GB) .................................. 0703275.8

(51) Int. Cl.

| | |
|---|---|
| ***G10L 21/00*** | (2013.01) |
| ***G10L 21/02*** | (2013.01) |
| ***G10L 15/00*** | (2013.01) |
| ***G10L 15/20*** | (2006.01) |
| ***G10L 21/0208*** | (2013.01) |
| *G10L 21/0232* | (2013.01) |

(52) U.S. Cl.

CPC ......... *G10L 21/0208* (2013.01); *G10L 21/0232* (2013.01)

USPC ............................ 704/226; 704/228; 704/233

(58) Field of Classification Search

None

See application file for complete search history.

(56) References Cited

U.S. PATENT DOCUMENTS 6,658,380 B1 * 12/2003 Lockwood et al. ........... 704/215
6,718,301 B1 * 4/2004 Woods .......................... 704/233
6,820,053 B1 * 11/2004 Ruwisch ....................... 704/232
6,826,528 B1 * 11/2004 Wu et al. ....................... 704/226
7,480,614 B2 * 1/2009 Huang .......................... 704/233
7,496,138 B2 * 2/2009 Pietraski et al. .............. 375/232
2001/0034600 A1 * 10/2001 Yasunaga et al. ............ 704/219
2002/0041678 A1 * 4/2002 Basburg-Ertem et al. ........................ 379/406.01
2003/0026482 A1 * 2/2003 Dance .......................... 382/199
2003/0187637 A1 * 10/2003 Kang et al. .................... 704/226
2004/0001450 A1 * 1/2004 He et al. ........................ 370/286
2004/0151303 A1 * 8/2004 Park et al. ................ 379/406.01
2005/0278172 A1 * 12/2005 Koishida et al. .............. 704/227
2006/0098766 A1 * 5/2006 Pietraski et al. .............. 375/346
2009/0012786 A1 * 1/2009 Zhang et al. .................. 704/233
2009/0255535 A1 * 10/2009 Kanzer .................... 128/206.14

FOREIGN PATENT DOCUMENTS

EP 1 607 938 A 12/2005
WO WO2005/009019 A2 1/2005

OTHER PUBLICATIONS

International Search Report, PCT/IB2007/004498, date of mailing Aug. 7, 2008.

(Continued)

*Primary Examiner* — Douglas Godbold
*Assistant Examiner* — Michael Ortiz Sanchez
(74) *Attorney, Agent, or Firm* — Sonia Cooper; Jim Ross; Micky Minhas

(57) ABSTRACT

A method of estimating noise in data containing voice information and noise includes receiving the data as a sequence of input values; transforming the data by applying a first non linear mapping to the input values wherein the derivative function of the mapping decreases in magnitude as the input values increase in magnitude smoothing the transformed data; and transforming the smoothed transformed data by applying a second non linear mapping that is opposite to the first non linear mapping, to determine an estimate of the noise in the inputted data.

20 Claims, 5 Drawing Sheets

(56) References Cited

OTHER PUBLICATIONS

"Foreign Office Action", Chinese Application No. 200780051547.2, (May 25, 2011), 6 pages.

"Written Opinion", Application No. PCT/IB2007/004498, (Aug. 20, 2009), 4 pages.

* cited by examiner

METHOD OF ESTIMATING NOISE LEVELS IN A COMMUNICATION SYSTEM

RELATED APPLICATION

This application claims priority under 35 U.S.C. §119 or 365 to Great Britain, Application No. 0703275.8, filed Feb. 20, 2007. The entire teachings of the above application are incorporated herein by reference.

TECHNICAL FIELD

The present invention relates to communication systems. More particularly the present invention relates to a method and apparatus for estimating noise levels in a communication system.

BACKGROUND

In a communication system a communication network is provided, which can link together two communication terminals so that the terminals can send information to each other in a call or other communication event. Information may include speech, text, images or video.

Modern communication systems are based on the transmission of digital signals. Analogue information such as speech captured by a microphone is input into an analogue to digital converter at the transmitter of one terminal and converted into a digital signal. The digital signal is then encoded and placed in data packets for transmission over a channel to the receiver of a destination terminal.

Background noise in the vicinity of the terminal in which the speech is input is transmitted together with the speech information in the digital signal. This results in the speech information output at the destination terminal being obscured by the noise transmitted with the signal. Also, the presence of noise in the signal interferes with the speech signal encoding, leading to audibly increased coding distortions or an increased transmission rate.

Attempts have been made to filter the signal to reduce the degree of noise input into the encoder at the transmitting terminal. In order to remove the noise from the signal input into the encoder a noise level estimation is required.

Low complexity noise level estimation used for terminals such as mobile devices typically smooth a frequency domain input signal using recursive low-pass filters or time-averaging to estimate the noise level.

An example of a low-pass filter is a 1st order auto-regressive filter as shown in Equation 1:

$$y[n]=\alpha y[n-1]+(1-\alpha)x[n] \quad \text{Equation (1)}$$

Wherein y[n] is the output for filtered element n, x[n] is the input for the filtered element n and $\alpha$ is the smoothing coefficient, with a value between 0 and 1. Increased smoothing is obtained by increasing the smoothing coefficient $\alpha$.

A further example of a low-pass filter is a fast implementation of the same auto-regressive filter, as shown in Equation (2):

$$y[n]=x[n]+\alpha(y[n-1]-x[n]), \quad \text{Equation (2)}$$

Low complexity noise level estimation techniques have a low memory requirement and are well suited for devices with low computational power and a limited memory space.

However, one problem with using a low-pass filter to produce a noise level estimate is that when the incoming signal consists of both background noise and speech, the increase in the signal energy caused by periods of speech leads to a bias towards higher noise value estimates.

In the prior art methods, this problem is reduced by adjusting the noise level estimation when the presence of speech is detected. In prior art methods increased smoothing during the detected period of speech activity is used to account for the increase in signal energy due to presence of speech in the signal. However, speech presence detection is not always reliable for several reasons. When the speech detector has just recently been initialized, not enough history information may be present to reliably distinguish speech from noise. Also, speech and noise levels may be confused. This occurs particularly when the first few frames of speech have a low energy and are mistaken for background noise. Speech and noise levels may also be confused when noise and/or speech levels are changing over time. When speech is falsely detected as noise, a bias towards higher noise level estimates results. On the other hand, when noise is falsely detected as speech, the noise level estimator will not efficiently use the available information, resulting in less accurate estimates.

It is therefore an aim of the present invention to overcome the problems presented by the prior art. It is a further aim of the present invention to provide a method of improving the quality of the output signal without the use of complex computational methods that have large memory requirements.

SUMMARY

According to a first aspect of the present invention there is provided a method of estimating noise in data containing voice information and noise comprising the steps of: receiving the data as a sequence of input values; transforming the data by applying a first non linear mapping to the input values wherein the derivative function of the mapping decreases in magnitude as the input values increase in magnitude; smoothing the transformed data; and transforming the smoothed transformed data by applying a second non linear mapping that is opposite to the first non linear mapping, to determine an estimate of the noise in the inputted data.

According to a second aspect of the present invention there is provided a noise estimation device for estimating noise in data containing voice information and noise comprising: receiving means for receiving the data as a sequence of input values; first transforming means for transforming the data by applying a first non linear mapping to the input values wherein the derivative function of the mapping reduces in magnitude as the input values increase in magnitude; smoothing means for smoothing the transformed data; and second transforming means for transforming the smoothed transformed data by applying a second non linear mapping that is opposite to the first non linear mapping, to determine an estimate of the noise in the inputted data.

According to a third aspect of the present invention there is provided a noise estimation device for estimating noise in data containing voice information and noise comprising: a receiver arranged to receive the data as a sequence of input values; a first transformer arranged to transform the data by applying a first non linear mapping to the input values wherein the derivative function of the mapping reduces in magnitude as the input values increase in magnitude; a smoother arranged to smooth the transformed data; and a second transformer arranged to transform the smoothed transformed data by applying a second non linear mapping that is opposite to the first non linear mapping, to determine an estimate of the noise in the inputted data.

Embodiments of the invention provide several advantages.

One advantage of smoothing a signal that has been transformed according to the method provided by embodiments of the invention to determine noise estimates is that the reduced sensitivity to large increases in values of the input signal results in less bias in the noise level estimates when speech presence detection errors occur. This improves the accuracy of the noise level estimates and allows simple speech detection methods to be used in embodiments of the present invention.

In known noise level estimate methods, it is necessary to alter the smoothing coefficient in the filter for high energy signal levels to compensate for speech detection errors. However in embodiments of the invention the degree to which the smoothing coefficient is required to change in response to the detection of speech presence is reduced. This improves the tracking of changing noise levels and accelerates initial convergence of the noise level estimates.

Since the accuracy of the noise level estimates is improved, simple recursive filters can be used in the present invention to obtain results otherwise only achievable with more complex methods.

Since simple low-pass filters and simple speech detection methods may be used in embodiments of the present invention, less computational complexity is required.

BRIEF DESCRIPTION OF THE DRAWINGS

For a better understanding of the present invention and to show how the same may be carried into effect, embodiments of the present invention will now be described with reference to the following drawings:

FIG. 1(*b*) shows a graph of a signal with large sudden energy changes filtered with a low-pass filter;

FIG. 1(*c*) shows a graph of a signal with large sudden energy changes when the values of the input signal 1(*a*) are inverted to reciprocal values before the signal is filtered by a low-pass filter and inverted again afterwards;

FIG. 2(*b*) shows a graph of a signal with small sudden energy changes filtered with a low-pass filter;

FIG. 2(*c*) shows a graph of a signal with small sudden energy changes when the values of the input signal 1(*a*) are inverted to reciprocal values before the signal is filtered by a low-pass filter and inverted again afterwards;

DETAILED DESCRIPTION

Figure 1A:
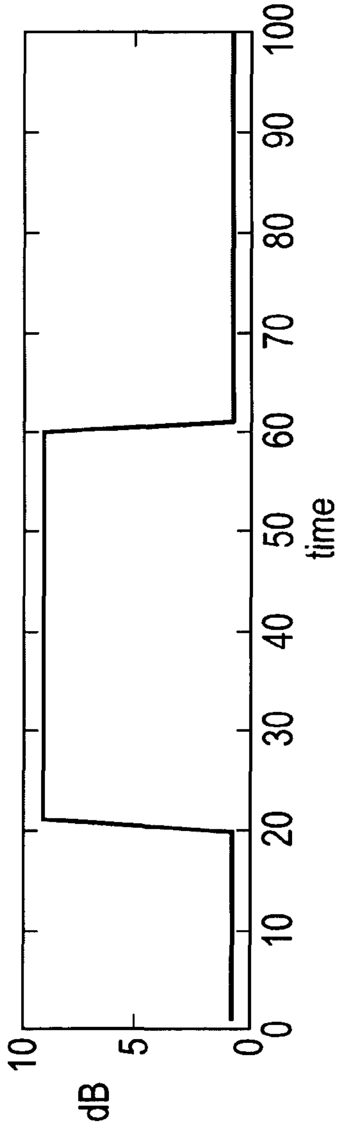
FIG. 1(*a*) shows a graph of a signal with large sudden energy changes.
Figure 1B:
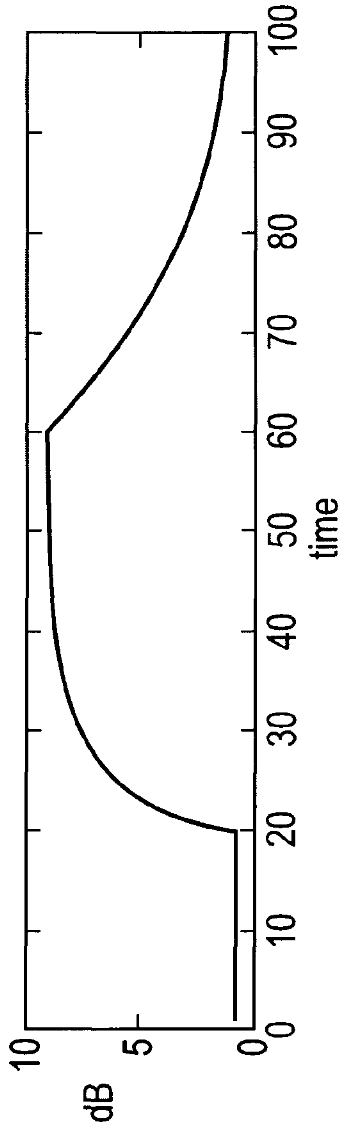
Figure 1C:
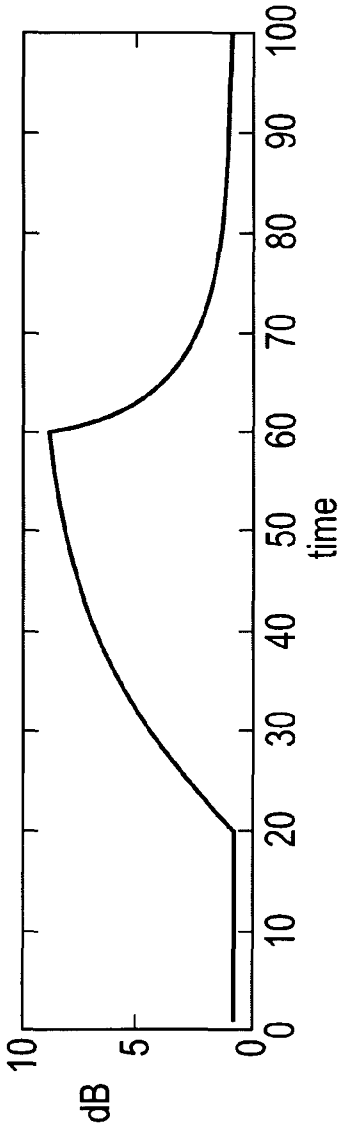

Reference is first made to FIG. 1 which shows the effect of smoothing a signal with large sudden energy changes over time. FIG. 1(*a*) shows the energy level measured in decibels (dB) of an input signal. The energy level of the signal is shown to increase sharply from 0 dB to 10 dB and to remain at this level until the energy of the signal decreases sharply to 0 dB. As such the input signal can be seen to comprise a positive step where the signal increases to 10 dB and a negative step where the signal decreases from 10 dB.

FIG. 1(*b*) shows the energy level of the signal, when the input signal 1(*a*) is filtered using a low-pass filter. In a preferred embodiment of the invention, the low pass filter is a recursive filter.

As shown, when the signal is filtered by a low-pass filter the filtered signal increases to 10 dB more gradually than the input signal increases to 10 dB. As shown in FIG. 1(*b*), it can be seen that the filtered signal also decreases from 10 dB more gradually than the input signal decreases from 10 dB.

FIG. 1(*c*) shows the energy level of the signal when the values of the input signal 1(*a*) are inverted to reciprocal values before the signal is filtered by a low-pass filter. More particularly FIG. 1(*c*) shows the output after the resulting values of the filtered inverted signal have been inverted again to reverse the previous inverting operation on the signal.

The graph shown in FIG. 1(*c*) is also represented by Equation (3) when a smoothing coefficient α of 0.9 is used:

$$y(n) = 1\Big/\left(\frac{\alpha}{y(n-1)} + \frac{1-\alpha}{x(n)}\right) \quad \text{Equation (3)}$$

where x(n) are input energies of the input signal as shown in FIG. 1(*a*) and where y(n) are the filtered output energies that have been inverted again to reverse the previous inverting operation on the signal as shown in FIG. 1(*c*).

Equation (3) represents the combination of three sequential steps: (i) inversion of the input signal as shown below in Equation 4, (ii) smoothing as shown in Equation 5 and (iii) inversion of the output signal as shown in Equation 6. These three steps can be described mathematically as follows:

$$v(n) = \frac{1}{x(n)} \quad \text{Equation 4}$$

$$w(n) = \alpha w(n-1) + (1-\alpha)v(n) \quad \text{Equation 5}$$

$$y(n) = \frac{1}{w(n)} \quad \text{Equation 6}$$

where v(n) is the inverted value of the input energy x(n) and where w(n) is the smoothed output of the inverted value v(n). Substitution of Equation 4 and Equation 6 in equation 5 yields Equation 3.

The inventors of the present invention have found that, for high changes in energy signals, when the filtering operation is performed on inverted energy values of the input signal, the rate at which the signal increases by 10 dB is noticeably reduced compared to the rate at which the non inverted filtered signal increases as shown in FIG. 1(*b*). However the rate at which the inverted filtered signal decreases by 10 dB is increased compared to the rate at which the non inverted filtered signal decreases by 10 dB.

For example, as shown in FIG. 1(*b*) the output values of a non inverted filtered signal follow a positive step of the input values faster than the output values follow a negative step. Conversely, as shown in FIG. 1(*c*), the output values of an inverted filtered signal follow a negative step of the input values faster than the output values follow a negative step. As a result, output values of an inverted filtered signal are less sensitive to large increases in values of the input signal. This is caused by Jensen's inequality, a known mathematical theorem that will not be described any further herein.

Figure 2A:
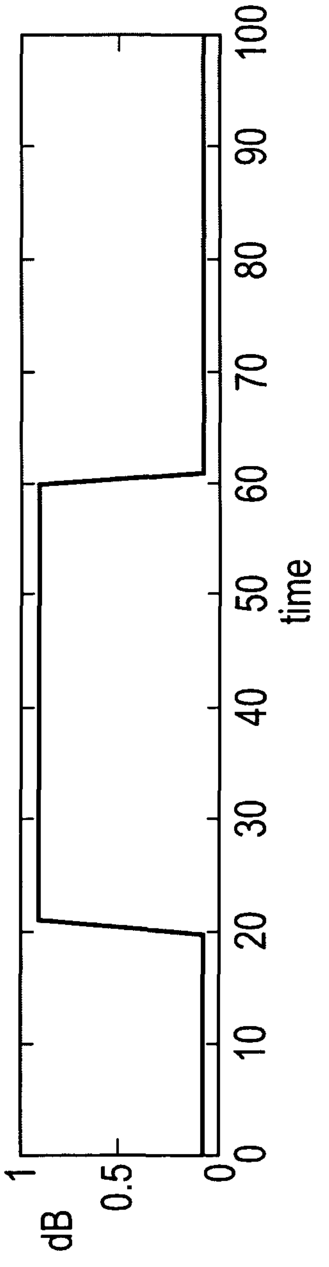
FIG. 2(*a*) shows a graph of a signal with small sudden energy changes.
Figure 2B:
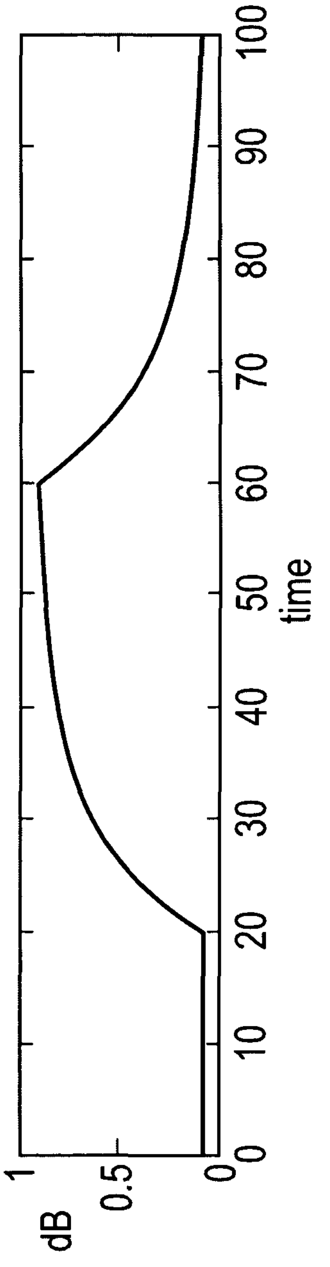
Figure 2C:
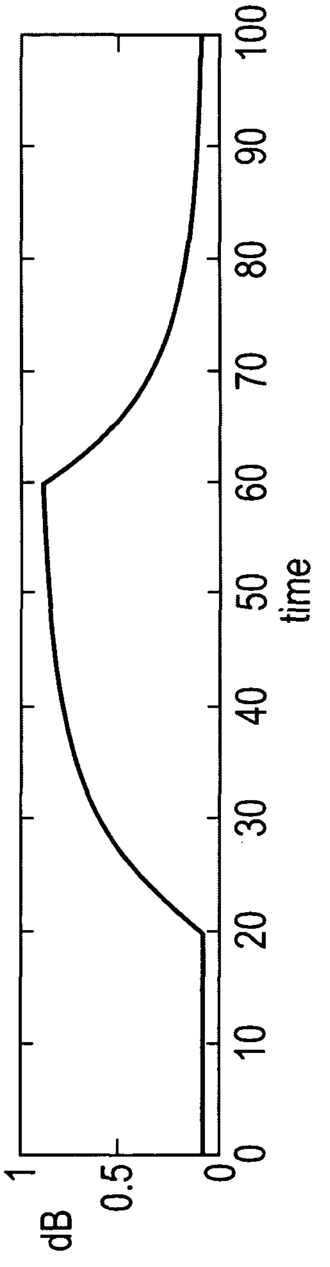

Reference is now made to FIG. 2. FIG. 2 shows the effect of smoothing a signal with small sudden energy changes over time. FIG. 2(*a*) shows the input signal which is shown to increase to a maximum of 1 dB. FIG. 2(*b*) shows a signal output from a low pass filter where the filtered values are not inverted prior to filtering. FIG. 2(*c*) shows a signal output from a low pass filter where the filtered values are inverted prior to filtering. As shown in FIGS. 2(*b*) and 2(*c*), the difference between the rate at which the output values follow the positive step and the negative step of a low energy input signal is much smaller than for a high energy signal. Again, the filtered inverted signal shown in FIG. 2(*c*) can be represented by the equation (3) above.

Comparing FIGS. 1(*b*) and 1(*c*) which show the output of a filtered non inverted signal and the output of a filtered inverted signal respectively for high energy changes in the input signal, the inventors have identified that output values of an inverted filtered signal follow positive changes in the input signal more slowly than output values of a non inverted filtered signal follow changes in the input signal. Accordingly the output of a filtered inverted signal is less sensitive to large positive energy changes.

Conversely, comparing FIGS. 2(*b*) and 2(*c*) which show the output of a filtered non inverted signal and the output of a filtered inverted signal respectively for low energy changes, the inventors have identified that output values of an inverted filtered signal follow changes in the input signal at the same rate as the output values of a non inverted filtered signal follow changes in the input signal. Accordingly the output of a filtered inverted signal has the same sensitivity as the output of a filtered non inverted signal for small energy changes.

Furthermore, the inventors have found that any non linear mapping that has a derivative function that reduces in magnitude as input values increase in magnitude may be used to invert or transform the signal prior to smoothing the signal.

According to embodiments of the present invention noise estimates are determined from smoothing an inverted input signal. The way in which embodiments of the invention may be implemented will now be described.

Figure 3:
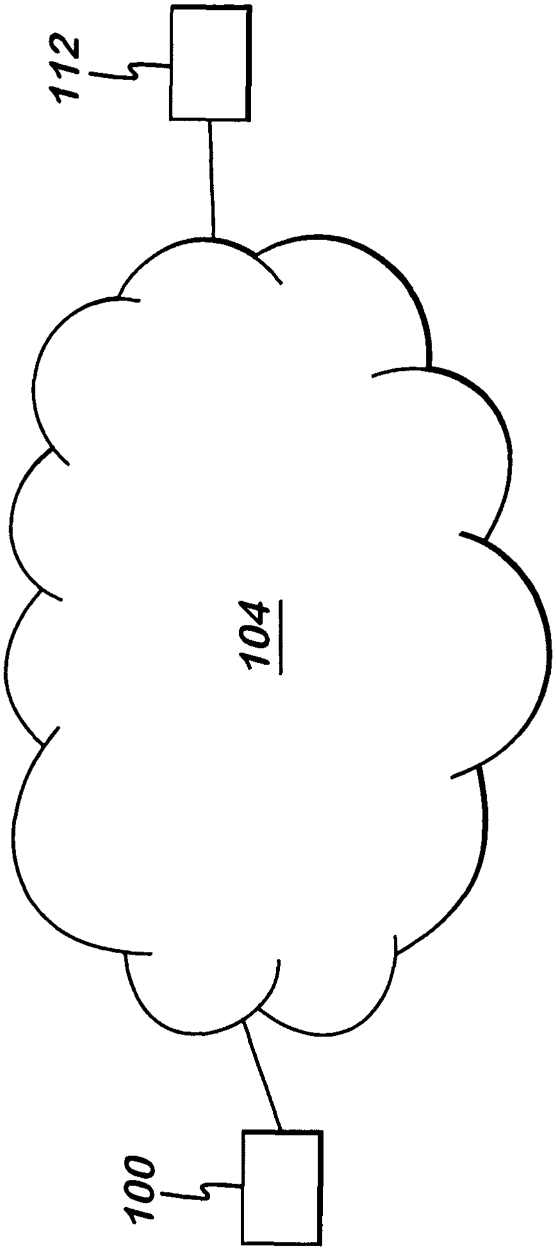
FIG. 3 shows a communication network.

Reference will now be made to FIG. 3 which shows a communication network 104 used in an embodiment of the present invention. The communication network 104 may be a VoIP (Voice Over Internet Protocol) network provided by the internet. It should be appreciated that even though the exemplifying communications system shown and described in more detail herein uses the terminology of a VoIP network, embodiments of the present invention can be used in any other suitable communication system that facilitates the transfer of data. For example the present invention may be used in mobile communication networks such as GSM, UMTS and CDMA networks.

FIG. 3 shows a source terminal 100 and a destination terminal 112 connected the network 104. The source terminal is arranged to transmit data to the destination terminal 112 via the communications network 104.

The terminals 100 and 112 may be, for example, a personal computer, a gaming device, a personal digital assistant, a suitably enabled mobile phone, a television or other device able to connect to the network 104.

Figure 4:
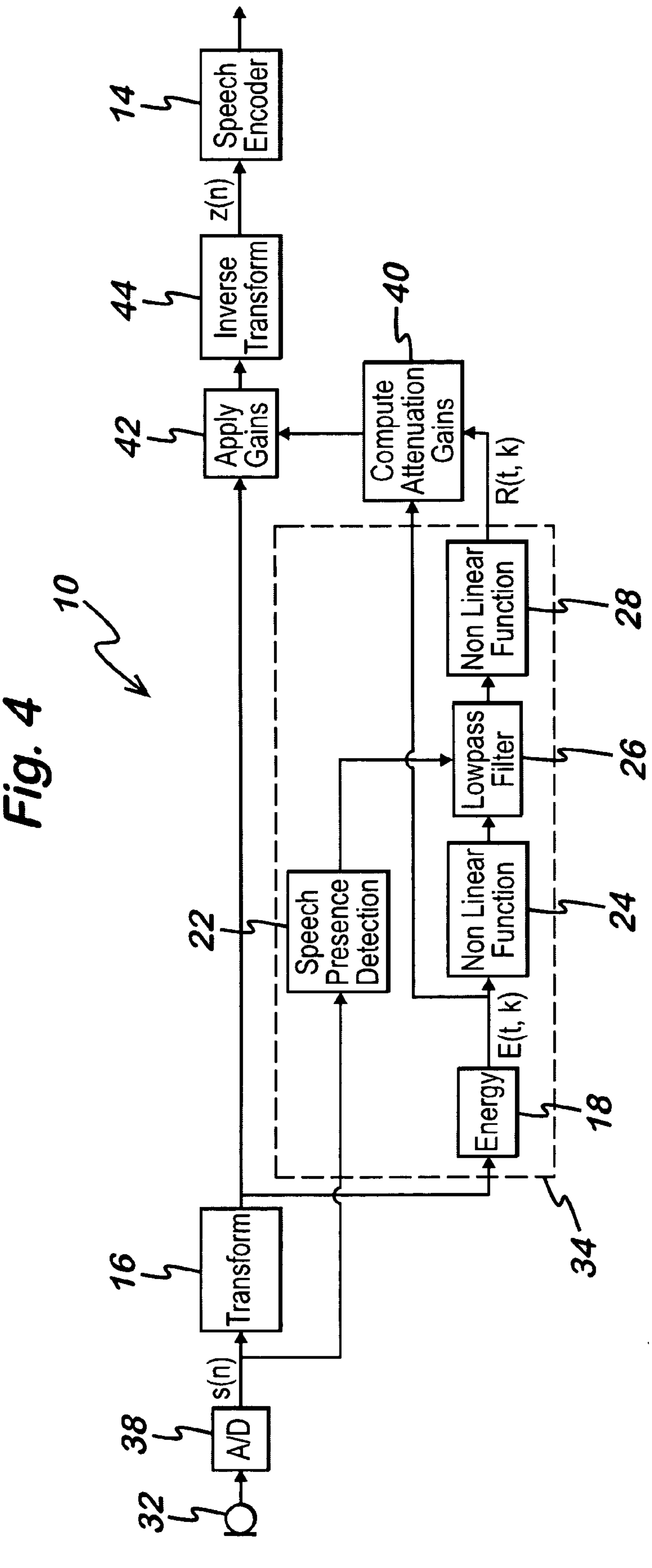
FIG. 4 shows a transmitting terminal according to an embodiment of the present invention.

FIG. 4 shows the source terminal 100 according to an embodiment of the present invention. The source terminal has transmitting circuitry 10 for transmitting signals to the destination terminal via the network 104.

The transmitting circuitry 10 includes an analogue to digital converter 38, a noise level estimator block 34 and an encoder 14. The analogue to digital converter 38 receives an audio input from a microphone 32 and converts the signal to a digital signal. The digital signal s(n) output from the analogue to digital converter 14 consists of digital samples of speech with background noise.

The digital signal s(n) output from the analogue to digital converter is input into a speech presence detection block 22 in the noise level estimator block 34. The speech presence detection block 22 determines whether speech information is present in the input signal s(n). The speech level presence detection block 22 outputs an indication of whether speech is present to a filter block 26 provided in the noise level estimator block 34. The speech presence indication may be a binary signal (speech present or not) or a probability signal (an indication of the likelihood of that speech is present). The manner in which the speech presence detection block determines if speech is present is known in the art and will not be described further herein.

The digital signal s(n) output from the analogue to digital converter 38 is also input into a transform block 16. The transform block 16 converts the input signal s(n) to a transform domain signal. The transform may be a frequency transform implemented as a Fast Fourier Transform, a Discrete Cosine Transform, a Filterbank Transform, or any other transform such as a Karhunen Loève Transform.

The transform domain signal is input into an energy block 18 in the noise level estimator block 34. The energy block 18 converts the transform domain signal output from the transform block 16 to a positive signal. This may be achieved by, for example, computing the energy of each transform domain sample, to produce the power spectrum.

The power spectrum output from the energy block 18 is then input into a first non linear function block 24 which applies a non linear function on the power spectrum. The derivative of the non linear function applied in block 24 decreases in magnitude as the magnitude of the power spectrum increases. One example of such a non linear function is Equation 7:

$$f(x)=(x+b)^{-1} \qquad \text{Equation (7)}$$

wherein a bias b is added to the input power spectrum value and the resulting biased input power spectrum is transformed to its reciprocal value. Adding a bias to the power spectrum ensures that the value being transformed to its reciprocal value is always greater than zero. Ensuring that the signal is always greater than zero avoids division-by-zero in Equation 7. Adding a bias also reduces the sensitivity of the Noise Level Estimator to very small input signals.

Another example of a function that has a derivative that decreases in value with increasing input values is Equation 8:

$$f(x)=\log(x+b) \qquad \text{Equation (8)}$$

wherein a bias b is added to the input power spectrum value and the resulting biased input power spectrum is transformed to its logarithmic value. Adding a bias to the power spectrum ensures that the value being transformed to its logarithmic value is always greater than zero. Ensuring that the signal is always greater than zero avoids taking the logarithm of zero in Equation 8. Adding a bias also reduces the sensitivity of the Noise Level Estimator to very small input signals.

Equation 7 and Equation 8 are examples of non linear functions that have a derivative that decreases in magnitude with increasing input magnitudes. According to embodiments of the invention the non linear function block 24 may apply any non linear function that has a derivative that decreases in magnitude with increasing input magnitudes.

In one embodiment of the invention, different bias values b in Equation 7 and Equation 8 may be applied by the non linear function block 24 to different frequency bands of the power spectrum.

The transformed power spectrum signal output from the non linear function block 24 will be referred to as the inverse power spectrum.

The inverse power spectrum is input into the filter block 26. As previously described, the filter block 26 also receives an input from the speech presence detection block 22 which indicates whether speech is present in the signal. In the filter block 26, each band of the inverse power spectrum is time filtered.

Any smoothing operation may be applied by filter block 26 which smoothes the input signal over time. In a preferred embodiment the smoothing operation may be performed by a low pass filter. In an alternative embodiment of the invention the smoothing operation may be performed by time averaging.

In an embodiment of the invention, the smoothing operation may apply time resampling, in which the sampling rate of the output of the filter block 26 differs from the sampling rate of the input of the filter block 26.

In one embodiment of the invention the filter applied in filter block 26 may be implemented by the recursive filter:

$$y(t,k)=\alpha y(t-1,k)+(1-\alpha)x(t,k) \qquad \text{Equation 9}$$

Where x(t, k) is the filter input at time t for frequency band k, y(t, k) is the filter output at time t for frequency band k and a is the smoothing coefficient of the filter.

The filter block 26 is controlled by the speech presence indication such that the amount of smoothing applied by the filter increases when speech is present or likely to be present. As such, the noise estimation sensitivity decreases when speech is present. In one embodiment of the invention the smoothing coefficient $\alpha$ is set to 0.99 when the speech presence detection block indicates that no speech is present. When the speech presence detection block indicates that there is speech present the filter block 26 increases the smoothing coefficient $\alpha$ to 1.

Increasing the smoothing coefficient to 1 keeps the noise level estimate constant during the indication of speech presence. As shown by Equation 10, when $\alpha$ is 1 Equation 9 becomes:

$$y(t,k)=y(t-1,k) \qquad \text{Equation 10}$$

The output of the filter block 26 is input into the second non linear function block 28. At the second non linear function block the filtered inverse power spectrum is mapped back in to the power spectrum domain. The second non linear function 28 is arranged to apply an opposite transformation to the transformation that the first non linear function 24 applied to the signal.

For example, if the first transformation that is applied by non linear function block 24 maps the input to its biased multiplicative inverse according to Equation 7, then the second transformation applied by non linear function 28 will map the output of the filter block to its unbiased multiplicative inverse according to Equation 11:

$$f(x)=x^{-1}-b \qquad \text{Equation (11)}$$

where b is a bias of the same value as the one applied in the first non linear function block 24.

Similarly, if the first transformation is a biased logarithmic mapping according to Equation 8 then the second transformation is an exponential mapping followed by a negative bias, according to Equation 12:

$$f(x)=\exp(x)-b \qquad \text{Equation (12)}$$

where b is a bias of the same value as the one applied in the first non linear function block 24.

Also, if the first non linear function block 24 maps the input to its arc tangent before filtering, the second non linear function block 28 will map the output of the filter block to the tangent of the output of the filter block 26.

The signal output from the second non linear function 28 is the noise level estimate signal R(t, k) at time t in transform band k.

The noise level estimate signal R(t,k) is input into a compute attenuation gains (CAG) block 40. The CAG block 40 also receives the power spectrum E(t,k) from the energy block 18. The CAG block 40 calculates noise reduction gains by comparing the energy of each frequency band of the power spectrum E(t, k) output from energy block 18 to the energy of each frequency band of the estimated noise level signal R(t, k). The gain may be computed by Equation 12:

$$G(t,k)=\max\left(1-\frac{R(t,k)}{E(t,k)},0\right) \qquad \text{Equation (13)}$$

Where G(t, k) is the attenuation gain at time t for frequency band k. Since the noise estimation signal R(t, k) and the power spectrum signal E(t, k) are always positive, the attenuation gain G(t, k) is guaranteed to be in between 0 and 1.

The attenuation gain will be close to 0 when the power spectrum signal E(t, k) frequency band energy is similar to the estimated noise level signal R(t, k) frequency band energy. Conversely the attenuation gain will be close to 1 when the power spectrum signal E(t, k) frequency band energy is much larger to the estimated noise level signal R(t, k) frequency band energy. The noise reduction gains G(t, k) computed at the CAG block 40 for each frequency band are output to the apply gains block 42.

The transform domain signal output from the transform block 16 is input to the apply gains block 42. At the apply gains block 42, the gain for each frequency band calculated by the CAG block 40 is applied to each frequency band of the transform domain signal. The gain is applied by multiplying each frequency band of the transform domain signal with the corresponding gain.

The signal is output from the apply gains block 42 to an inverse transform block 44 where it is converted back to a time-domain signal with an inverse transform. The inverse transform applied by the inverse transform block 44 is such that the sequence of transform applied by the transform block 16, the apply gains block 42 and inverse transform applied by the inverse transform block 44 essentially reproduces the signal input into the transform block 16, with a time delay and corrected for noise by the noise level estimator block 34. Examples of inverse transforms are inverse Fast Fourier Transforms, inverse Discrete Cosine Transforms, Filterbank Transforms, and transposed Karhunen Loève Transforms.

The time domain signal output from the inverse transform block is then input into the encoder 14 where it is encoded according to an encoding scheme. The encoded signal is then transmitted to the destination terminal 112 via the communication network 104.

Figure 5:
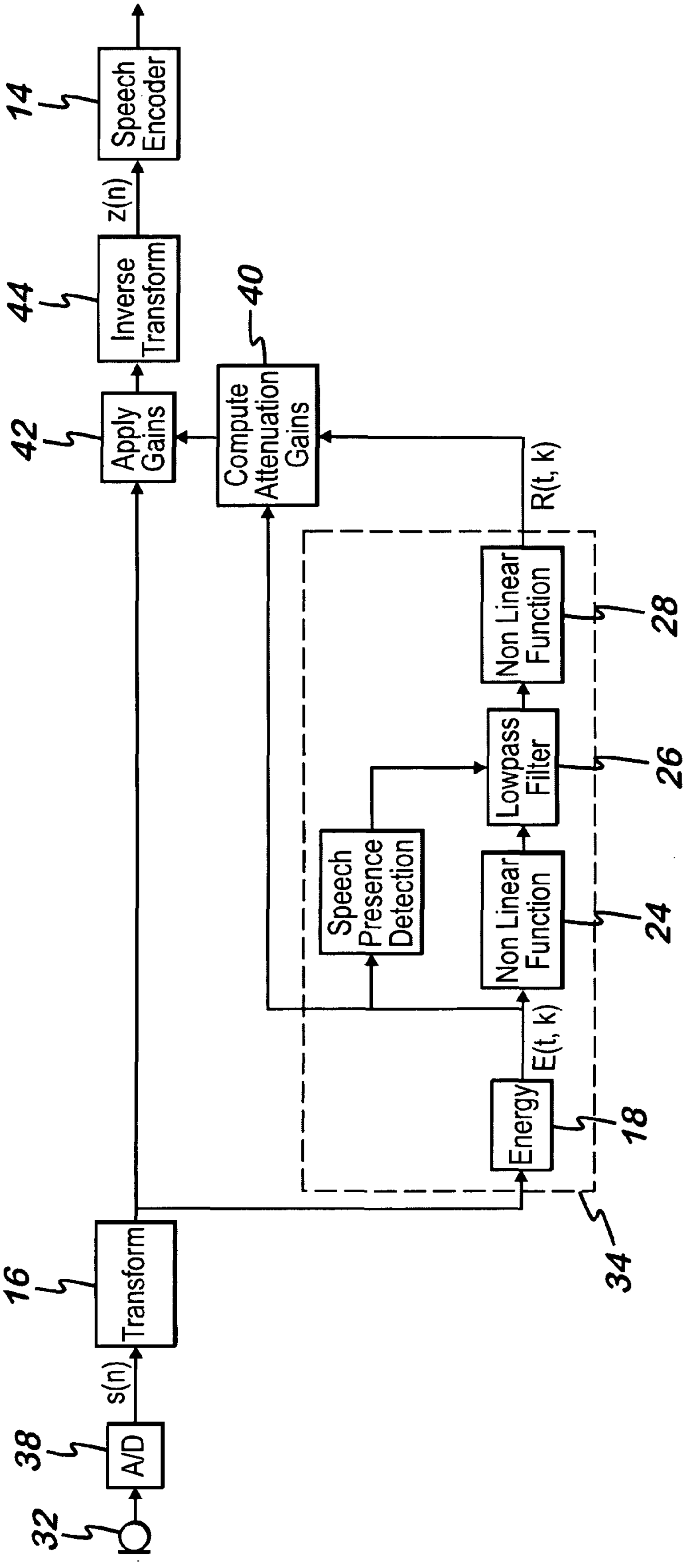
FIG. 5 shows a transmitting terminal according to an alternative embodiment of the present invention.

FIG. 5 shows the source terminal 100 according to an alternative embodiment of the present invention. The components that are described in relation to FIG. 4 are referred to in FIG. 5 using like reference numerals.

According to the embodiment shown in FIG. 5, each frequency band of the power spectrum of the signal is smoothed in the filter block 26' independently. In this embodiment of the invention, the signal is input into the speech presence detection block 22' after it has been converted to a power spectrum by the energy block 18. This allows the speech presence detection block 22' to determine the speech presence for each frequency band of the power spectrum. The speech presence detection block then outputs a speech level indication signal for each frequency of the power spectrum to the filter block 26'.

The filter block 26' filters each frequency of the inverted power spectrum according to the presence of speech on each frequency as indicated by the speech presence detection block. Therefore if speech is detected on one frequency band of the signal and not on another, a lower smoothing coefficient may be used for the frequency band on which no speech is detected than for the frequency band on which speech is detected.

In an alternative embodiment of the invention the noise level estimation block may be provided in the receiving circuitry of the destination terminal 112.

In an alternative embodiment of the invention the invention may be implemented in signal processing systems that do not involve transmitting the data to a destination terminal via a communication network. For example transmitting circuitry described above may be used to output a signal directly to a loudspeaker as used in Public Address systems. Alternatively the output may be recorded on a digital or analogue recording medium to be played back at a later time as used in dictation machines and music recording equipment.

In embodiments of the invention the components of the noise level estimator block may be implemented as hardware in the terminal or as software running on a processor in the terminal. This is an implementation issue.

While this invention has been particularly shown and described with reference to preferred embodiments, it will be understood to those skilled in the art that various changes in form and detail may be made without departing from the scope of the invention as defined by the claims. In particular, when the non linear function block 24 is described as applying a non linear function that has a derivative that decreases in magnitude with increasing input magnitudes, it should be appreciated that this includes any non linear function that has a derivative that generally decreases in magnitude with increasing input magnitudes, that is over a sequence of input values from smallest to largest the derivative has altered from a larger value to a smaller value notwithstanding the fact that there may be some values within the sequence which do not follow that pattern.

What is claimed is:

1. A method of estimating noise level in data including voice information and noise, the method comprising:

receiving the data as a sequence of input values, the data provided in a frequency domain signal comprising frequency bands;

adding a bias value to at least two of the input values of the sequence, the bias values based, at least in part, on a corresponding frequency band;

transforming the data provided in the frequency domain signal comprising frequency bands by applying a first non linear mapping to the input values and the corresponding bias values, a derivative function of the first non linear mapping decreasing in magnitude as the input values increase in magnitude;

smoothing the transformed data, the smoothing being performed by a filter block comprising two inputs, one of the two inputs receiving the transformed data and another of the two inputs receiving speech indicator data from a speech detector;

transforming the smoothed transformed data by applying a second non linear mapping to the smoothed transformed data and the corresponding bias values, the second non linear mapping being opposite to the first non linear mapping;

determining an estimate of the noise level in the data based, at least in part, on the transforming the smoothed transformed data; and using the determined estimate of the noise level in the data to produce a noise corrected signal.

2. A method as claimed in claim 1 wherein the smoothing comprises smoothing the transformed data using a low pass filter.

3. A method as claimed in claim 1 wherein the smoothing comprises smoothing the transformed data using time averaging.

4. A method as claimed in claim 1 wherein the smoothing comprises smoothing the transformed data using a smoothing coefficient.

5. A method as claimed in claim 4 further comprising detecting an indication of a presence of voice information in the data and increasing the smoothing.

6. A method as claimed in claim 5 wherein the smoothing is constant during the detecting the indication of the presence of the voice information.

7. A method as claimed in claim 5 wherein the increasing the smoothing comprises increasing the smoothing coefficient.

8. A method as claimed in claim 7 wherein the increasing the smoothing coefficient comprises increasing the smoothing coefficient to a value of 1.

9. A method as claimed in claim 4 further comprising:

applying the smoothing coefficient for each frequency band of the frequency domain signal, detecting an indication of voice presence for each frequency band of the frequency domain signal; and increasing the smoothing coefficient applied to a particular frequency band of the frequency domain signal if an indication of voice presence is detected for the particular frequency band.

10. A method as claimed in claim 1 wherein the first non linear mapping comprises a logarithmic mapping.

11. A method as claimed in claim 10 wherein the second non linear mapping comprises an exponential mapping.

12. A method as claimed in claim 1 wherein the first non linear mapping and the second non linear mapping maps the data to a multiplicative inverse of the data.

13. A method as claimed in claim 1 wherein transforming the data provided in the frequency domain signal comprising frequency bands by applying the first non linear mapping, smoothing the transformed data, and transforming the smoothed transformed data by applying the second non linear mapping are represented by an equation comprising:

$$y(n) = 1 \Big/ \left( \frac{\alpha}{y(n-1)} + \frac{1-\alpha}{x(n)} \right)$$

where x(n) comprises the input values of the sequence, where y(n) comprises noise estimate values, and where a comprises a smoothing coefficient.

14. A method as claimed in claim 1 further comprising, prior to transforming the data, adding different bias values to at least some of the input values based on a corresponding frequency band.

15. A method as claimed in claim 1, wherein applying the first non linear mapping to the input values comprising mapping each of the input values to a respective arc tangent, and wherein applying the second non linear mapping to the smoothed transformed data comprises mapping the tangent of the smoothed transformed data.

16. A system, comprising:

one or more processors; and memory, communicatively coupled to the one or more processors, storing one or more components configured to implement operations comprising:

receiving data as a sequence of input values, the data provided in a frequency domain signal comprising frequency bands and including voice information and noise;

adding a bias value to at least two of the input values of the sequence, the bias values based, at least in part, on a corresponding frequency band;

transforming the data provided in the frequency domain signal comprising frequency bands by applying a first non linear mapping to the input values and the corresponding bias values, a derivative function of the first non linear mapping decreasing in magnitude as the input values increase in magnitude;

smoothing the transformed data, the smoothing being performed by a filter block comprising two inputs, one of the two inputs receiving the transformed data and another of the two inputs receiving speech indicator data from a speech detector;

transforming the smoothed transformed data by applying a second non linear mapping to the smoothed transformed data and the corresponding bias values, the second non linear mapping being opposite to the first non linear mapping;

determining an estimate of a noise level in the data based, at least in part, on the transforming the smoothed transformed data; and using the determined estimate of the noise level in the data to produce a noise corrected signal.

17. A system as claimed in claim 16 wherein the smoothing comprises smoothing the transformed data using time averaging.

18. A system as claimed in claim 16 wherein the smoothing comprises smoothing the transformed data using a smoothing coefficient.

19. A mobile device, comprising:

one or more processors; and memory, communicatively coupled to the one or more processors, storing one or more components configured to implement operations comprising:

receiving data as a sequence of input values, the data provided in a frequency domain signal comprising frequency bands and including voice information and noise;

adding a bias value to at least two of the input values of the sequence, the bias values based, at least in part, on a corresponding frequency band;

transforming the data provided in the frequency domain signal comprising frequency bands by applying a first non linear mapping to the input values and the corresponding bias values, a derivative function of the first non linear mapping decreasing in magnitude as the input values increase in magnitude;

smoothing the transformed data, the smoothing being performed by a filter block comprising two inputs, one of the two inputs receiving the transformed data and another of the two inputs receiving speech indicator data from a speech detector;

transforming the smoothed transformed data by applying a second non linear mapping to the smoothed transformed data and the corresponding bias values, the second non linear mapping being opposite to the first non linear mapping;

determining an estimate of a noise level in the data based, at least in part, on the transforming the smoothed transformed data; and using the determined estimate of the noise level in the data to produce a noise corrected signal.

20. A mobile device as claimed in claim 19 wherein the smoothing comprises smoothing the transformed data using a low pass filter.

* * * * *